May 22, 1951 W. A. TOLSON 2,554,317

CLAMP CIRCUIT

Filed Dec. 18, 1946

INVENTOR.

William R. Tolson

BY

W. S. Grover

ATTORNEY

Patented May 22, 1951

2,554,317

UNITED STATES PATENT OFFICE 2,554,317

CLAMP CIRCUIT

William A. Tolson, Princeton, N. J., assignor to Radio Corporation of America, a corporation of Delaware Application December 18, 1946, Serial No. 716,991

17 Claims. (Cl. 178—7.1)

Figure 1:
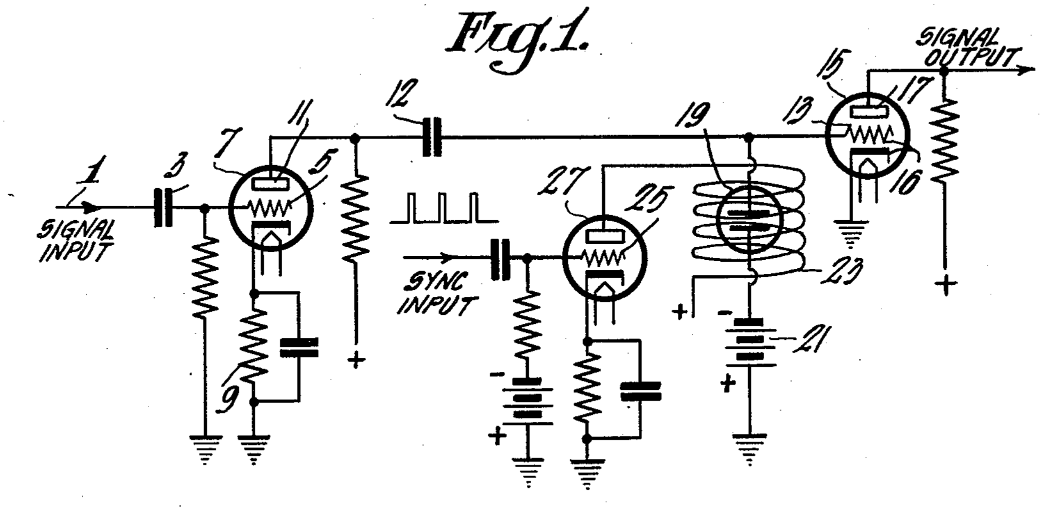

This invention relates to a clamp circuit and more particularly to direct current reinserting circuits for television systems.

The transmission of signals composed of alternating currents in combination with a direct current component requires the provision of a direct current circuit or a circuit including transformers, together with equipment for reinserting the direct current component.

It will be seen that the requirement for maintaining the direct current component in a television image signal is particularly important and was recognized as such early in the art. Among the earliest references to reinserting the direct current component, one finds reference thereto and disclosures of some systems in the Ives et al. Patent No. 2,037,471, granted April 14, 1936, and the Horton Patent No. 2,003,294, granted June 4, 1935. Later in the Gray Patent No. 2,274,686, granted March 3, 1942, provision is made for automatically maintaining and establishing the direct current component of the signal of purely automatic means. Also, in U. S. Patent No. 2,252,746 granted to P. W. Willans on August 19, 1941, there is described a television receiver circuit for reinserting the direct current component of the image signal at the cathode ray tube and thereby controlling the picture or image background. This circuit comprises a diode circuit connected across the input of the cathode ray tube. It has been found that, while this circuit functions satisfactorily to provide automatic background control, it tends to reduce the high frequency response of the system at the control grid of the cathode ray tube. This is because the diode capacity is connected across the cathode ray input electrodes and therefore adds to the cathode ray tube input capacity.

In the U. S. patent granted to R. C. Ballard, No. 2,240,281, dated April 29, 1941, this objection was eliminated by the use of inductance coils which act to increase the high frequency response both because they resonate a portion of the circuit at a frequency falling just beyond the high frequency end of the desired pass band or otherwise peak the high frequency response. The diode capacity is then isolated from the cathode ray tube input capacity.

Other improvements in the art have been made, such as, for example, shown and described in the U. S. patents granted to Karl R. Wendt, Nos. 2,299,944 and 2,299,945, both dated October 27, 1942. In the Wendt patents just referred to, the direct current reinserting circuit is keyed to respond during the time interval allotted to the associated synchronizing signal impulses. This improvement has the advantage of permitting the transmission of image signals without interference by the equipment necessary to provide the required direct current reinsertion.

According to this invention, a relatively simple and effective system is employed for the reinsertion of direct current component in a signal transmission system. A glow discharge device is connected between a biasing potential and the signal amplifier or modulator system in such a manner that the desired bias is applied to the system during the predetermined time intervals which may be controlled to occur only during the time interval occupied by synchronizing pulses. According to a preferred form of this invention, the glow discharge tube has an associated exciting coil which is charged by an amplified synchronizing impulse.

A primary object of this invention is to provide an improved form of clamping circuit.

Another object of this invention is to provide an improved D. C. inserting means for television systems wherein improved efficiency of operation may be realized with simplified circuit components.

Figure 2:
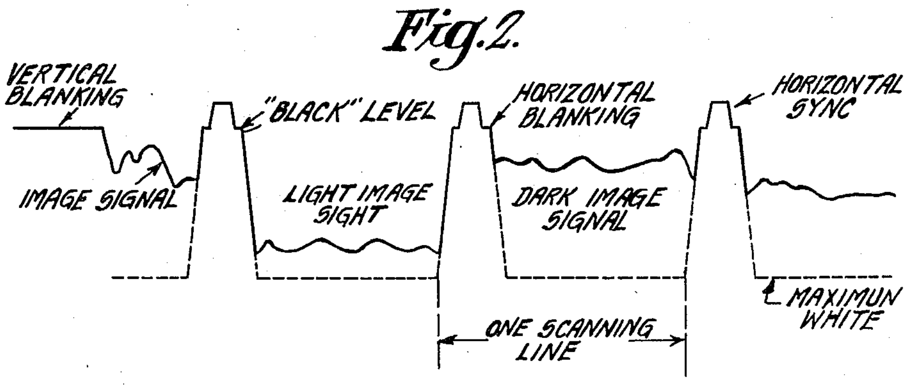
Figure 3:
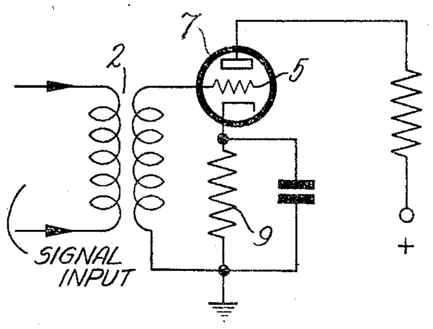

Other and incidental objects of the invention will be apparent to those skilled in the art from a reading of the following specification and an inspection of the accompanying drawing in which Figure 1 shows schematically a preferred form of this invention;

Figure 2 illustrates graphically a typical television signal to which the practice of this invention is particularly applicable; and, Figure 3 illustrates a different form of input which may be used with the arrangement shown in Fig. 1.

Turning now in more detail to Figure 1, there is shown schematically a system employing a signal input circuit 1 which may be provided with an image signal of, for example, a television receiver such as that shown and described in the U. S. reissue patent to Carlson, No. 20,700, issued April 19, 1938. While the input signal has been shown coupled to the following tube through a condenser 3, it will be understood that in some cases it may be desirable to use transformer coupling. Such an arrangement is shown in Fig. 3 wherein a transformer 2, has replaced the condenser 3 of Fig. 1. The input tube is coupled to the remainder of the circuit exactly as in Fig. 1.

Coupling condenser 3 allows the control electrode 5 of tube 7 to establish its own bias level through the cathode resistor 9. The associated anode 11 of tube 7 is capacitively coupled through condenser 12 to control electrode 13 of tube 15. Tube 15 contains an associated cathode 16 and anode 17. The signal output is obtained from anode 17.

A glow discharge device 19 is connected between control electrode 13 and a fixed bias potential source 21. It is obvious that other forms of fixed bias potential source 21 may be utilized but, for the purpose of explanation, a battery will be shown.

Glow discharge device 19 operates as an electric relay or the like. When the gas in the glow discharge device 19 is ionized, the discharge device becomes in effect a closed circuit. Although the resistance of tube 19 is very low when in its ionized state, the resistance of tube 19 is extremely high when the gas is not ionized.

The gas in the glow discharge tube 19 may be ionized in several different ways, it may be ionized or charged by exciting an auxiliary internal electrode or by an electrostatic charge derived from an associated external electrode. For the purpose of explanation of one preferred form of this invention, an associated inductance coil 23 is provided for this purpose.

Such a glow discharge device and associated inductance coil utilized as an exciter is shown and described in U. S. patent granted to K. Fischer, No. 1,328,041, patented January 13, 1920.

It is usually preferred that the direct current component be reinserted by establishing the reference current or voltage level during predetermined time intervals. This is accomplished by utilizing a periodic impulse or synchronizing signal to excite the coil 23 associated with glow discharge device 19. By applying the impulse or synchronizing signal to control electrode 25 of tube 27, an amplified impulse may be passed through coil 23, which will cause a magnetic field sufficient to ionize the gas in the glow discharge tube 19. The glow discharge tube 19 will then become a closed circuit upon the application of a signal impulse, and for that interval that the glow discharge tube 19 is conducting the potential of the control electrode 13 of the amplifying tube 15 will be brought to the predetermined reference level voltage in that the charge in condenser 12 is brought to the potential of the bias battery or other source 21. Thus, the charge in condenser 12 holds for each line period but is reset each time the glow tube conducts, so that regardless of the incoming signal, there will be a predetermined reference level voltage due to the connection of condenser 12 to the source 21, which can be effective on the grid of tube 15, since glow tube 19 will conduct in either direction.

The gas contained in the glow discharge tube 19 will cease to be ionized after the completion of an impulse. This, of course, results in substantially an open circuit through the glow discharge tube 19. The control electrode 13 is therefore permitted to follow the fluctuations of the principal signal during intervals between the control impulses or synchronizing signals.

The operation of this circuit as applied to television systems may be more readily understood from an analysis of a typical video signal. Figure 2 shows a portion of a typical video signal extending over a time interval including several horizontal or line frequency synchronizing impulses.

The video signal employed for the transmission of television signals includes the voltage or current amplitudes generated during the scanning of the image together with the interim periods during which the synchronizing and blanking signals are transmitted. It will be seen that the current or low voltage amplitude is divided into two sections. The upper section including approximately 25% of the total signal amplitude is devoted to synchronizing signals, and the remaining lower section to image signals. Normally, the polarity of the current or voltage is chosen so that as the amplitude of the video signal increases, the corresponding brightness in the reproduced image decreases.

It will also be seen that white tones in the image are produced by low amplitudes in the image signal. Successively deeper grays are represented by higher amplitudes until at the level shown in Figure 2, wherein the amplitude marked vertical and horizontal blanking represents a total absence of light. This is called "black level." The black level is a fixed amplitude in the video signal. This level has been arbitrarily fixed at a value of approximately 75% of the maximum amplitude of the signal, and during transmission this level is maintained constant relative to the maximum level of the signal. (For this form of signal see, for instance, reference thereto in "Television Standards and Practice" by D. G. Fink, published in 1943 by McGraw-Hill Book Co., Inc., New York, and particularly pages 18 et seq. thereof.)

Wherever the image is bright, the signal amplitude is low, and conversely where the image is dark, the signal amplitude is high. The variations in current or voltage illustrated in Figure 2 occurring between the pedestals upon which the synchronizing pulse is placed are produced by the camera tube of the transmitting system as it scans the lines of the image. At the conclusion of the first line, the camera becomes inactive while the scanning beam is retracing to the beginning of the next line. The inactivity of the scanning beam results from the amplitude of the video signal being at black level during this interval.

Immediately after the beginning of the blanking period, the signal amplitude is caused to rise momentarily into the blacker than black region by the synchronizing impulse superimposed on the signal circuit by the synchronizing signal generator.

It will be understood that the image signal must convey information both as to the instantaneous amplitude that corresponds to the brightness of the image element scanned at the instant or the instantaneous aspect of the signal, and the image signal must also include an average value that corresponds to the average illumination of the scene. This may be termed as the steady-state aspect of the image signal, and is usually referred to as the "D.-C. component." The instantaneous and D.-C. components of the image signal may vary independent of one another. The instantaneous component provides the detailed information, while the D.-C. component provides background information. For example, a given scene superimposed on a bright background gives the impression of sunlight, brightness and warmth, while the same details superimposed on a dark background may convey the impression of moonlight, darkness and cold. The latter provides an exactly opposite effect in the image, although the detail remains substantially the same.

The D.-C. component may also be considered as the average value of the image signal averaged over the whole frame (or field, in some instances) scanning interval and is often referenced from "black level" or the "top" of the blanking pedestal.

Suppose, for example, it is desired that the detail remain unchanged, but that it is desirable to make the scene appear brighter in the reproduced image. It will become apparent that this effect would be accomplished by increasing the direct current voltage component of the signal. The detail or A.-C. component remains the same, but the instantaneous signal amplitude or brightness of each element has been increased by an equal amount. The reproduced scene is therefore made to appear brighter, and if no further change is made, the scene may appear "thin," since the ratio of brightness between the high lights and shadows is decreased. The apparent brightness contrast of the reproduced image is reduced. On the other hand, if a direct current voltage is decreased, the average brightness decreases and the apparent brightness contrast will be caused to increase.

The D.-C. component may be increased or decreased in a variety of ways. It may be changed arbitrarily by adding a voltage to the transmission circuit from a manually controlled source of direct voltage.

Camera tubes, such as the iconoscope, are not capable of generating the proper direct current or voltage component, since the mosaic capacitance is in series with the signal circuit. The output signal of the iconoscope consists of only the A.-C. component of the image signal. The iconoscope is shown and described in an article entitled "Theory and Performance of the Iconoscope" by V. K. Zworykin, G. A. Morton, and L. E. Flory, beginning on page 1071 of the "Proceedings of the Institute of Radio Engineers" for August 1937.

In order to provide the D.-C. component and thereby convey the average brightness of the scene being televized, auxiliary devices are often employed such as a phototube which is adjusted to furnish the D.-C. component of the image. The D.-C. component is then added to the image signal before transmission. The D.-C. component is added subsequent to video frequency range, capacity coupling, and inductance coupling. This process is known as "reinsertion of the D.-C. component."

The reinsertion of the D.-C. component refers to the establishment of a given voltage level in the video signal as a fixed reference and insuring that this reference does not change as the wave form of the camera signal changes.

It will be seen that in order to convey the D.-C. component to the receiving set, it is necessary to transmit a signal representative of the reference level periodically in order that the receiving set may pick up the reference level and establish the proper D.-C. component.

According to one preferred form of this invention, a glow discharge device is connected between the grids of the modulating tubes and a fixed reference potential representative of the "black" reference level, and the glow discharge device is made operative only during the time intervals allotted to the blanking signal component of the video signal.

To provide a fixed reference of voltage level in the video signal, the blanking level is taken as a fixed reference and caused to have a constant value in the envelope of the modulated carrier. Any variation of the average of the wave form away from or toward the blanking level thus established causes a brightening or a darkening of the image. Hence, such variations of the wave form average are used to establish the desired image brightness and to produce the desired change of image.

The D.-C. component for establishing the "black" reference in the amplitude of the modulated envelope is established by the D.-C. bias applied to the grids of the modulating amplifier tubes, and this reference level remains fixed throughout the transmission. The values of signal above the bias value correspond to the synchronizing signal region, those below it to the image signal. The average of the image signal content must, of course, correspond to the background illumination of the scene, and once this average has been established relative to the blanking level, it must be maintained throughout the system.

In view of the fact that receiving sets include capacitive and inductance coupling at the video frequency range, a provision must be made for the reinsertion of the D.-C. component immediately before the reproduction of the television image.

According to a preferred form of this invention, a glow discharge device activated during blanking intervals is connected between the control electrode of an image reproducing tube and a fixed bias potential to establish the "black" reference level in the reproduced image.

Returning to Figure 1, it will be seen, therefore, that the direct current component and hence the information concerning the correct average brillance of the image will be reinserted in the signal train in the receiver just prior to reproduction of the image by charging condenser 12 during fixed level signals and in effect clamping the potential of the control electrode 13 to the predetermined reference level only during intervals that the signal train is at a predetermined fixed level. Hence, the potential of the control electrode 13 will always correspond to the potential of the signal train including both the A.-C. and D.-C. components.

A light and dark image signal is illustrated in Figure 2 to show that, so far as the A.-C. component is concerned, there is very little difference, but it will be seen that the dark image signal contains a greater amount of D.-C. component than the light image signal.

It follows that by returning the system to a reference voltage level, such as a black level, periodically during the transmission of video signals, it is possible to maintain the proper D.-C. component of the image signal for the proper reproduction of the television image.

The periodic transmission of the "black level" also performs another important function. A scanning operation requires that the electron beam be extinguished during retrace time intervals. The "black level" signal is therefore also termed a "blanking signal."

The vertical blanking signal illustrated is employed to extinguish the electron beam during the vertical retrace of the scanning operation. At the completion of the vertical blanking, the image signal commences. The image signal continues for a time interval sufficient to carry the deflection to the end of a scanning line, where the horizontal blanking signal is applied. The horizontal synchronizing impulse is then added to the composite signal during the interval of the horizontal blanking. The synchronizing pulse is also added to the signal during vertical or field blanking, but is not illustrated in Figure 2.

Although the operation of a preferred form of this invention has been set forth in connection with its functions in a television system, it is not the intention that this invention is limited thereto, but is applicable to numerous other devices wherein it is necessary to provide for D.-C. reinsertion.

Having thus described the invention, what is claimed is:

1. In a signalling system employing a composite signal including a direct current signal component and at least one component signal of predetermined signal reference level for said system and wherein said system includes a serially connected direct current signal component blocking element, a clamp circuit for re-establishing said direct current signal component to said system following said direct current signal component blocking element, comprising in combination a glow discharge tube capable of bi-directional current flow connected between said system following said direct current signal component blocking element and a source of predetermined potential, control means associated with said glow discharge tube to actuate said glow discharge tube, and means for charging said control means during the occurrence of said component signal of predetermined reference level.

2. In a signalling system employing a composite signal including a direct current signal component and at least one component signal of predetermined signal reference level for said system and wherein said system includes a serially connected capacitive element, a clamp circuit for re-establishing said direct current signal component to said system following said capacitive element comprising in combination a glow discharge tube capable of passing current in both directions, connected between said system following said capacitive element and a source of predetermined potential, an auxiliary gas discharge control coil arrangement associated with said glow discharge tube to actuate said glow discharge tube, and means for charging said auxiliary gas discharge control coil arrangement during the occurrence of said component signal of predetermined reference level.

3. In a signalling system employing a composite signal including a direct current signal component and at least one component signal of predetermined signal reference level for said system and wherein said system includes a transformer, a clamp circuit for re-establishing said direct current signal component to said system following said transformer comprising in combination a glow discharge tube capable of passing current in both directions connected between said system following said transformer and a source of predetermined potential, an external gas discharge control coil associated with said glow discharge tube to actuate said glow discharge tube, and means for charging said external control means during the occurrence of said component signal of predetermined reference level.

4. In a signalling system employing a composite signal including a direct current signal component and at least one component signal of predetermined signal reference level for said system and wherein said system includes a serially connected direct current signal component blocking element, a clamp circuit for re-establishing said direct current signal component to said system following said direct current signal component blocking element comprising in combination a bi-directional flow glow discharge tube, a tube having a control electrode and connected in said system following said direct current signal component blocking element, a connection between said control electrode, one terminal of said glow discharge tube and said direct current signal component blocking element, a source of predetermined potential connected to the other terminal of said glow discharge tube, an externally positioned electromagnetic element associated with said glow discharge tube to charge said glow discharge tube, and means for charging said electromagnetic element during the occurrence of said component signal of predetermined reference level.

5. In a signalling system employing a composite signal including a direct current signal component and at least one component signal of predetermined signal reference level for said system and wherein said system includes a serially connected direct current signal component blocking element, a clamp circuit for re-establishing said direct current signal component to said system following said direct current signal component blocking element comprising in combination a glow discharge tube of the bi-directional current flow type, a tube having a control electrode and connected in said system immediately following said direct current signal component blocking element, a connection between said control electrode, one terminal of said glow discharge tube and said direct current signal component blocking element, a source of predetermined potential connected to the other terminal of said glow discharge tube, an exciting coil associated with said glow discharge tube to actuate said glow discharge tube directly by induction, and means for charging said coil during the occurrence of said component signal of predetermined reference level.

6. In a signalling system employing a composite signal including a direct current signal component and at least one component signal of predetermined signal reference level for said system and wherein said system includes a serially connected direct current signal component blocking element, a clamp circuit for re-establishing said direct current signal component to said system following said direct current signal component blocking element comprising in combination a glow discharge tube, said glow discharge tube capable of passing current in either direction, a tube having a control electrode and connected in said system following said direct current signal component blocking element, a connection between said control electrode, one terminal of said glow discharge tube and said direct current signal component blocking element, a source of predetermined potential connected to the other terminal of said glow discharge tube, an exciting coil surrounding said glow discharge tube to actuate said glow discharge tube, and means for charging said coil during the occurrence of said component signal of predetermined reference level.

7. In a signalling system employing a composite signal including a direct current signal component and at least one component signal of predetermined signal reference level for said system and wherein said system includes a serially connected direct current signal component blocking element, a clamp circuit for re-establishing said direct current signal component to said system following said direct current signal component blocking element comprising in combination a bi-directional current flow glow discharge tube, a tube having a control electrode and connected in said system following said direct current signal component blocking element, said control electrode connected only to one terminal of said glow discharge tube and said direct current signal component blocking element, a source of predetermined potential connected to the other terminal of said glow discharge tube, means associated with said glow discharge tube to inductively actuate the glow of said glow discharge tube, and means for charging said latter means during the occurrence of said component signal of predetermined reference level.

8. In a signalling system employing a composite signal including at least one component signal of predetermined signal reference level for synchronizing said system and wherein said component signal recurs periodically, a clamp circuit comprising in combination a bi-directional current flow glow discharge tube connected between said system and a point of predetermined potential, an exciting coil associated with said glow discharge tube to ionize the gas of said glow discharge tube, and means for charging said coil upon the occurrence of said component signal of predetermined signal reference level.

9. In a signalling system employing a composite signal including at least one component signal of predetermined signal reference level for synchronizing said system following a system synchronizing pulse, and wherein said component signal recurs periodically, a clamp circuit comprising in combination a glow discharge tube of the bi-directional current flow type connected between said system and a point of predetermined potential, an exciting coil wound about said glow discharge tube to actuate said glow discharge tube, and means for charging said coil during the occurrence of said component signals of predetermined signal reference level.

10. In a signalling system employing a composite signal consisting of the principal intelligence conveying signals and of control pulses each recurring at regular intervals, a clamp circuit comprising in combination a signal transmission circuit in said system, a bi-directional current flow glow discharge tube, a series circuit including said glow discharge tube and a bias potential connected in parallel with said signal transmission circuit, an exciting coil having said glow discharge tube as its core to actuate said glow discharge tube, and means for charging said coil during the occurrence of said control pulses.

11. In a circuit for correction of a signal supplied from a certain source and having recurring control periods, the combination of a tube having a control grid and a cathode, a condenser connected in series with said source and said control grid, a charging and discharging circuit for said condenser which comprises a bi-directional current flow glow discharge tube so connected that the condenser may charge or discharge through said glow discharge tube, and keying means for making said glow discharge tube conducting during portions of said control periods and non-conducting between said control periods.

12. In a circuit for correction of a signal supplied from a certain source and having recurring control periods, the combination of a tube having a control grid and a cathode, a condenser connected in series with said source and said control grid, a glow discharge tube equally capable of passing current in either direction, a series circuit of a biasing potential and said glow discharge tube connected between said cathode and said control electrode, and gas ionizing means located external to and adjacent to said glow discharge tube for making said glow discharge tube conducting during portions of said control periods and non-conducting between said control periods.

13. In a circuit for correction of a signal supplied from a certain source and having recurring synchronizing pulse and control periods, the combination of a tube having a control grid and a cathode, a condenser connected in series with said source and said control grid, a bi-directional current flow glow discharge tube, a series circuit of a biasing potential and said glow discharge tube connected between said cathode and said control electrode, an exciting coil associated with said glow discharge tube to actuate said glow discharge tube, and means for charging said coil during said recurring control periods.

14. In a television system, means for developing synchronizing signals, a clamp circuit for restoring the D.-C. component to the image signal comprising the combination of a tube having a control grid and a cathode, a bi-directional current flow type glow discharge tube, a series circuit of a biasing potential and said glow discharge tube connected between said cathode and said control electrode, an exciting coil wound to produce a magnetic field about said glow discharge tube to actuate said glow discharge tube, and means for charging said coil during portions of the intervals devoted to synchronism.

15. In a television system, of the type employing synchronizing signal intervals, a clamp circuit for restoring the D.-C. component to the image signal comprising the combination of an amplifier tube having a control grid, a bi-directional current flow glow discharge tube, a source of reference potential representative of a black image, said glow discharge tube connected between said control electrode and said source of reference potential, an external exciting coil associated with said glow discharge tube to actuate said glow discharge tube, and means for charging said coil immediately following the intervals devoted to synchronism.

16. In a television system, of the type which devotes a portion of its transmitted time and energy to synchronism, a clamp circuit for restoring the D.-C. component to the image signal comprising the combination of an image producing tube having a control grid and a cathode, a bi-directional current flow glow discharge tube, a series circuit of a biasing potential and said glow discharge tube connected between said cathode and said control electrode, an exciting coil adjacent to said glow discharge tube to actuate said glow discharge tube by induction, and means for charging said coil adjacent portions of the intervals devoted to synchronism.

17. In a television system of the type transmitting intelligence signals blanking and synchronizing pulses, a clamp circuit for restoring the D.-C. component to the image signal comprising the combination of an image producing tube having a control grid, a bi-directional flow glow discharge tube, a series circuit of a biasing potential and said glow discharge tube connected between a point of fixed potential and said control electrode, an exciting coil associated with said glow discharge tube to actuate said glow discharge tube by induction, and means for charging said coil during said blanking pulses.

WILLIAM A. TOLSON.

REFERENCES CITED

The following references are of record in the file of this patent:

UNITED STATES PATENTS

| Number | Name | Date |
|---|---|---|
| 1,328,041 | Fischer | Jan. 13, 1920 |
| 2,015,885 | Dollenbach | Oct. 1, 1935 |
| 2,227,001 | Schlesinger | Dec. 31, 1940 |
| 2,244,240 | Blumlein | June 3, 1941 |
| 2,274,709 | Knoop | Mar. 3, 1942 |
| 2,299,945 | Wendt | Oct. 27, 1942 |